United States Patent [19]

Gassner et al.

[11] Patent Number: 5,406,987
[45] Date of Patent: Apr. 18, 1995

[54] APPARATUS AND METHOD FOR PRODUCING A WAVE WINDING

[75] Inventors: Edmund S. Gassner, Nidderau; Sadik Sadiku, Neuberg, both of Germany

[73] Assignee: Elmotec, Elektro-Motoren-Technik GmbH, Germany

[21] Appl. No.: 152,169

[22] Filed: Nov. 16, 1993

[30] Foreign Application Priority Data

Nov. 16, 1992 [DE] Germany .................. 42 38 467.2

[51] Int. Cl.6 .............................................. H02K 15/04
[52] U.S. Cl. ..................................... 140/92.1; 29/596
[58] Field of Search ................. 29/596, 598, 732, 736; 242/7.03; 140/92.1, 92.2

[56] References Cited

U.S. PATENT DOCUMENTS 4,512,376  4/1985  Barrera ........................ 140/92.1
5,316,227  5/1994  Oohashi et al. .................. 29/596 X Primary Examiner—Carl E. Hall
Attorney, Agent, or Firm—Robert J. Koch

[57] ABSTRACT

An apparatus and method for producing a wave winding for electric machine starters whereby visual wire winding sections are continuously and successfully shaped into a wave winding on a wind winding device former during the winding process with the aid of shaping elements which can be moved radially in and out of a horizontal winding plane to form the wave winding.

8 Claims, 2 Drawing Sheets

APPARATUS AND METHOD FOR PRODUCING A WAVE WINDING

BACKGROUND OF THE INVENTION

1. Field of the Invention

The invention relates to a method for producing a wave winding for electric-machine starters, whereby individual winding sections are continuously and successively shaped into a wave winding on a former during the winding process with the aid of shaping elements that can be moved by a radial component. The invention also relates to an apparatus for producing a wave winding for electric-machine starters.

2. Description of the Related Technology

In producing starters, the predominant practice is to prefabricate coils on a former, strip them off into a drawing device, and then draw them axially into the starter slots. Problems arise in producing or transferring a wave winding directly over the drawing tool or transfer tool.

DE-PS 33 43 390 shows a method and apparatus for coiling and putting a wave winding into the slots of starters. In the case of this apparatus, a complete coil is first wound onto a set of first shaping elements that are arranged in a circle, and then a set of second shaping elements acts against the coil from the outside and deforms it. In the same drawing operation with the radial stroke of the second shaping elements, the first shaping elements must give way until a wave winding is formed. Other publications are also known that feature similar designs. In contrast to the device described in JP 5653936 B2, these devices have one thing in common: they first wind an approximately round coil with several windings and then deform them, all of the windings together, to form a wave winding. This method is very expensive and susceptible to trouble because the device consists of a large number of moving parts. In order to achieve uniform wave-winding quality, the first shaping elements must operate synchronously with the second shaping elements or be equipped with expensive dash pots. Since all of the windings are deformed at the same time, a relatively large amount of force is required, and the device needs to be correspondingly more robust in design. Since shaping is done only once, the complete winding has been pre-wound onto shaping elements and a good deal of manufacturing time is lost since the winding device has to stop moving during the process of shaping and transferring the winding into the receiver.

On the other hand, the device of JP 5653936 B2 is obviously intended for winding only single-layer wave windings.

SUMMARY OF THE INVENTION

The goal of the present invention is to achieve a method of the type indicated above and an apparatus that is suitable for implementation thereof, by means of which the production of regular wave windings can be simplified and manufacturing can be done at lower cost than the prior art.

As proposed by the invention, the proposed method is accomplished by having the shaping elements contain pivot points in the former and in a support plate or in a guide disk which are able to swing essentially axially around these pivot points, as well as into and out of the winding plane. During the winding process the winding nozzle operates synchronously with the shaping elements, whereby each time the winding nozzle or former rotates, a wave winding is produced and is stripped off continuously.

In connection with the method of production, as in the case of JP 5653936 B2, winding, shaping, winding, shaping, etc. proceed continuously. One advantage of the present invention is that, after the winding process is completed, the wave winding has also been completed. The winding then only needs to be stripped off into a receiver.

For the implementation of the new method, an apparatus is proposed where the shaping elements are rigidly controlled by a curved track or by means of guide disks, and where the shaping elements have their pivot points in the former and the support plate or in guide disks.

At their lower wire-guide ends, the shaping elements are designed in the shape of mushroom caps with wire-guide grooves, in such a way that when the shaping elements with the mushroom cap swing inward radially, the wire-guide groove enters the winding plane. After a wave winding is produced, strippers push this winding forward axially on the former in the direction of a receiver.

In the previously described devices, where the winding nozzle winds around the former, there is the option of producing coil sections of a phase with interconnections. This is done in such a way that a complete wave winding provides a partial winding of a phase on the former, and this partial winding is stripped off into a receiver.

In the present invention, the winding wire is not cut off, but rather held in a longitudinal drawing device. After the receiver is indexed, the longitudinal drawing device moves toward the former, and the winding nozzle can start on a new coil section.

DETAILED DESCRIPTION OF THE PREFERRED EMBODIMENT

Figure 1:
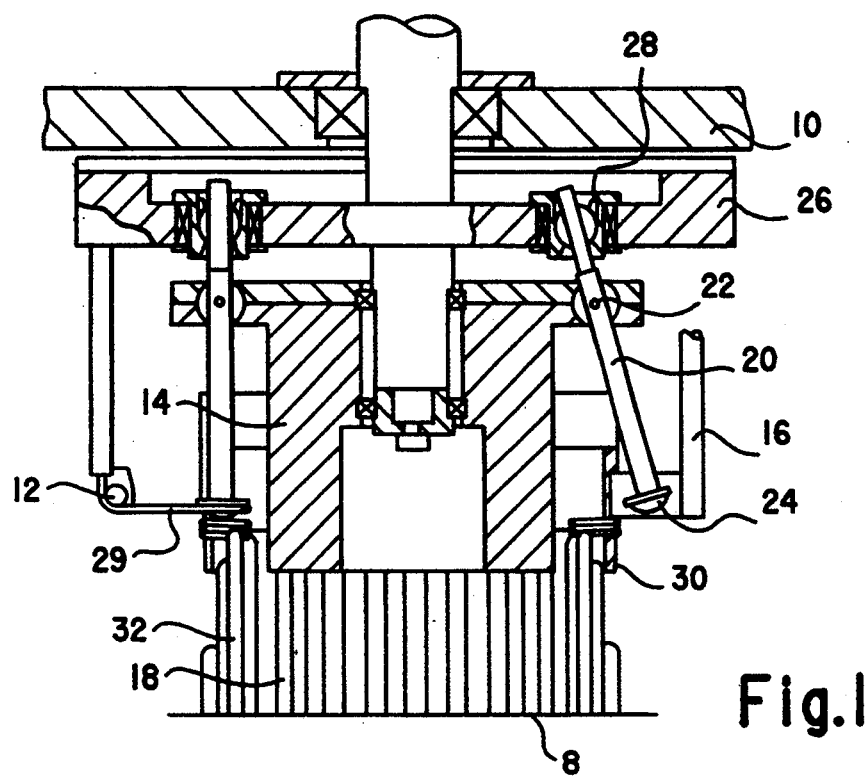
FIG. 1 is a cross-sectional view of the wave winding device of the present invention.

Winding device 8 shown in FIG. 1 has a machine housing 10, on which the parts described below are mounted. The winding device 8 has a rotating winding nozzle 12, a former 14, which is kept from rotating during the winding process, a stripper 16, and a receiver 18. Former 14 can be secured against turning by a locking gear, not shown, or by receiver 18. Shaping elements or shaping fingers 20 are positioned on the former 14 in such a way that they have a pivot point 22 in former 14, where at the lower end of shaping fingers 20, a mushroom cap 24 is disposed and can swivel radially. The swiveling capability of mushroom cap 24 is achieved by the action of a support plate 26 that is connected to winding nozzle 12 and can turn with it. Support plate 26 contains a curved track 28, and plate 26 engages the upper end of shaping elements or shaping fingers 20, i.e., shaping fingers 20 run along curved track 28 via pivot point 22 so that, as shown, left shaping finger 20 is guided vertically and the right shaping finger 20, with its mushroom cap 24, is guided toward the outside of winding device 8. If winding nozzle 12 now moves around former 14, shaping fingers 20, particularly mushroom caps 24, will be swung in and out radially.

Figure 2:
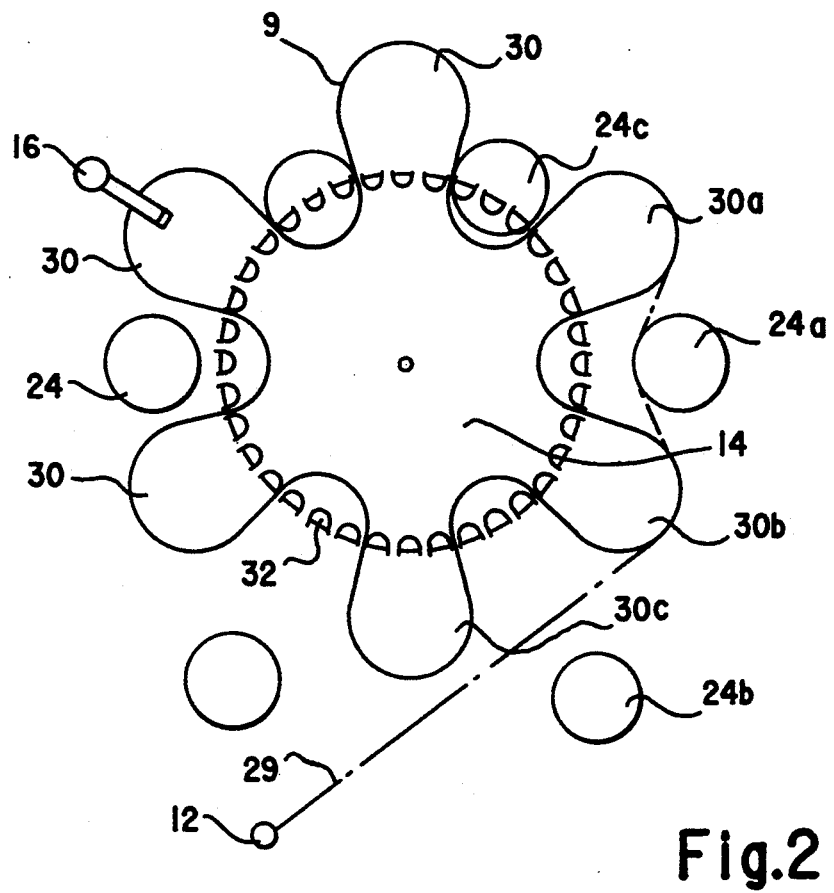
FIG. 2 shows a top view of a receiver with portions of a former of the present invention.

FIG. 2 shows a top down view of receiver 18, part of former 14, and the outline of a wave winding 9. Former 14 features an outer outline like a wave winding, whereby outer lifters 30 are absolutely necessary in order to deform the coil. The inner outline of wave winding 9 is shaped by shaping fingers 20.

During the winding process, winding nozzle 12 rotates around former 14 and lays wire 29 on lifters 30. After individual wire 29 has been laid onto lifters 30a and 30b, mushroom cap 24 (guided by curved track 28) then comes between lifters 30a and 30b and deforms wire 29 into the shape of a wave. This individual step takes place with each wave of a wave winding until a complete winding is produced.

The mushroom caps 24 are guided by pivot point 22 on former 14 and by support plate 26 with curved track 28. The guide design can be customized. In the preferred embodiment, it is required that mushroom cap 24, as shown in FIG. 2, deform the winding 9 and the individual section of wire 29 between lifters 30a and 30b on former 14 from an outer area of plates 32 into an inner area of plates 32.

The finished wave windings are stripped away and removed from former 14 during the winding process by strippers 16 that can be driven back and forth axially and are collected in receiver 18 which is made up of a ring of upright parallel fingers or plates 32. Receiver 18 may be a drawing tool or transfer grippers.

In order to ensure the smooth transfer of the wave windings from former 14 to receiver 18, former 14 extends part way into receiver 18.

The guiding of mushroom caps 24 as shown in FIG. 1 exhibits another feature of the present invention, because as depicted on the left side of winding device 8, shaping finger 20 is vertical. If curved track 28 now moves 180 degrees, shaping finger 20 swings outward as shown on the right side of winding device 8. By this method, mushroom cap 24 swings not only outward, but also somewhat upward and thus out of the area of the horizontal winding plane. This is necessary if wire 29 coming out of winding nozzle 12 lays on former 14, as in the example of FIG. 2, on lifters 30b and 30c. In that case, mushroom cap 24b must be swung out of the winding plane in order to make it possible for winding wire 29 to lay on former 14. Once the winding wire 29 is past mushroom head 24 and is on lifters 30a and 30b as shown in FIG. 2, mushroom cap 24a can swing freely inward and downward and simultaneously, on its way, carry wire 29 along and then shape it into a wave.

Figure 3:
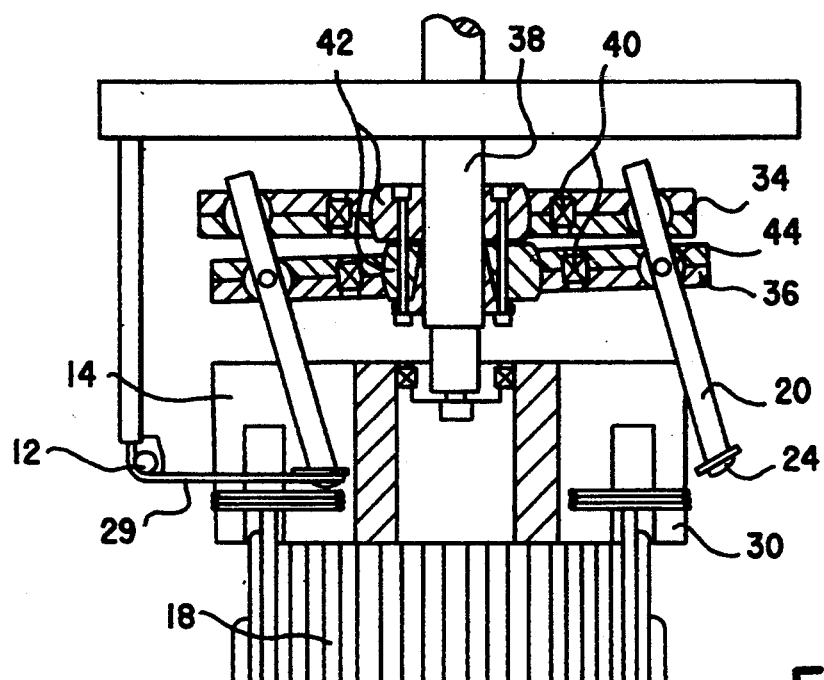
FIG. 3 is a sectional view of another embodiment of a winding device of the present invention.

Another embodiment of winding device 8 is shown in FIG. 3. It is distinguished from that in FIG. 1 by the fact that it is used only in guiding the excursion of shaping fingers 20. In this embodiment, as well as that shown in FIG. 1, there is a driveable winding nozzle 12, which rotates around an upright former 14 and lays wire windings on outside lifters 30, so that it can then move with shaping fingers 20 between lifters 30 and thus shape wire 29 into waves. Former 14 and the two guide disks, a locking disk 34, and a wobble plate 36 on which shaping fingers 20 are positioned are secured against twisting by a locking gear, not shown. The two guide disks 34 and 36 are flange-mounted to a rotating shaft 38, which rotates synchronously with winding nozzle 12 in the embodiment described here, but is prevented from rotating with the nozzle 12 by arrangement 40. By means of two cap bearings 42, two guide disks 34 and 36 can be set into their wobbling motion and at the same time cap bearings 42 can be eccentrically flange-mounted to shaft 38.

Shaping fingers 20 are mounted in wobble plate 36 at pivot point 44 on wobble plate 36 and are held and guided in locking disk 34. In the embodiment shown in FIG. 3, locking disk 34 is initially deflected only eccentrically, and wobble plate 36 is deflected eccentrically in the opposite direction. This gives rise to the relatively large excursion of the lower end of shaping fingers 20 by mushroom caps 24. If wobble plate 36 is also offset-mounted at cap bearing 42, this gives rise to an additional axial stroke of shaping fingers 20.

There are many possible embodiments, particularly if locking disk 34 is allowed to wobble as well or if the eccentricity of cap bearings 42 is offset 90 degrees.

Another embodiment is where shaping fingers 20 guide mushroom cap 24 in such a way that, on the one hand, the wire 29 is deformed and, on the other, wire 29 is received on the outer excursion of shaping finger 20 and in the inner area (inner turning point) wire 29 is pushed downward and released.

Figure 4:
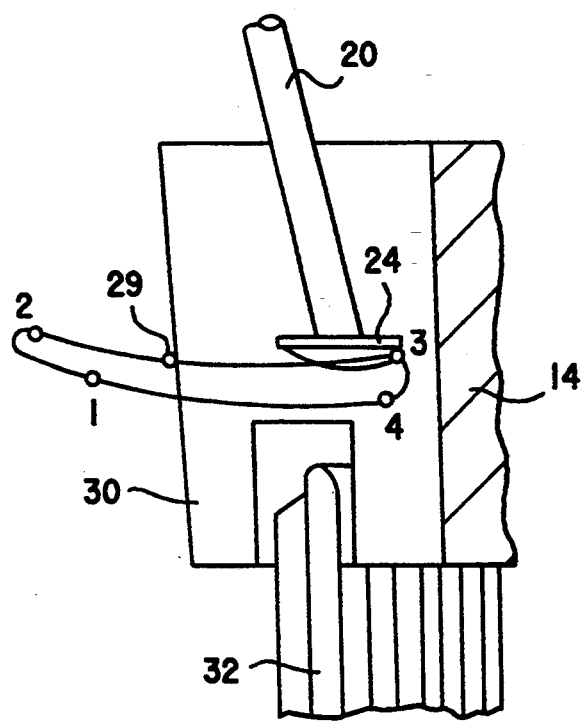
FIG. 4 shows a partial, cross-sectional view of a curved tract of a mushroom cap of the present invention.

FIG. 4 shows one possible curved track embodiment for mushroom cap 24. In this embodiment, mushroom cap 24 swings out of position 1 into another position 2 and then to other positions 3 and 4 until it reaches the beginning again. In position 2, where mushroom cap 24 reaches the highest position, wire 29 coming from winding nozzle 12 is laid on lifters 30 and carried by mushroom cap 24 as it travels from position 2 to position 3. Mushroom cap 24 drops from position 3, shown, into position 4 and thus pushes wire 29 downward and releases it at the same time. The return stroke from position 4 to position 1 and 2 is an upwards motion. FIG. 4 also clearly shows that wire 29 is rigidly guided from an outer area of plates 32 into an inner area of plates 32 and deformed.

Aside from the various embodiments shown in these figures, others are also possible. It is possible, for example, to position shaping fingers 20 in former 14 in such a way that mushroom cap 24 swings in and out only vertically. This has the drawback, however, that the wire 29 has to slip under the mushroom cap 24 during the winding process and may then be improperly collected by receiver 18.

The winding devices 8 shown in FIGS. 1 and 3 are universally applicable, and even with small changes in stack height can be readily adjusted by modifying the stroke of the shaping fingers 20. Larger changes in stack height can be made by adjusting lifters 30 radially. In an alternative embodiment, not shown, lifters 30 are adjusted radially one by one. In this way, the pins at lifters 30 can stop in predetermined holes in the former and guarantee uniform adjustment. Another embodiment, not shown, is to arrange lifters 30 on a fixed and a rotating disk.

In the fixed disk configuration, lifter 30 lies with a journal in a radial slot, and in the rotating disk, lifter 30 lies with its journal in a curved track so that when the rotating disk turns, all of lifters 30 move radially at the same time.

The foregoing disclosure and description of the invention are illustrative and explanatory of the preferred embodiments, and changes in the size, shape, materials and individual components, elements, connections and construction may be made without departing from the spirit of the invention.

What is claimed is:

1. A method of manufacturing a wave winding for electric starters, comprising the steps of:

laying wire on lifters disposed on a wave winding device by rotating a winding nozzle containing wire around a former disposed on said wave winding device;

shaping individual winding sections into a wave winding by swiveling shaping fingers of a wave winding device, where said fingers have a mushroom cap disposed on the lower end of each said finger, essentially radially about pivot points located on a former and on a support plate, whereby both said former and support plate are disposed on said wave winding device, so that said shaping fingers continuously and successively move in and out of a horizontal winding plane thereby shaping said wave winding.

2. The method of claim 1, wherein said step of shaping individual winding sections into a wave winding is accomplished by the step of swiveling shaping fingers of a wave winding device, where said fingers have a mushroom cap disposed on the lower end of each said finger, essentially radially about pivot points located on guide disks, whereby said guide disks are disposed on said wave winding device, so that said shaping fingers continuously and successively move in and out of a horizontal winding plane thereby shaping said wave winding.

3. The method of claim 1, wherein during said steps of shaping individual winding sections, a winding nozzle rotates synchronously with said shaping fingers, whereby each time said winding nozzle rotates, a wave winding is formed, which is then continuously stripped off axially onto a wave winding device receiver.

4. The method of claim 1, wherein after the step of shaping individual winding sections is completed, all said wave windings are stripped off said former and collected on a wave winding device receiver in a single operation.

5. An apparatus for manufacturing a wave winding for electric starters, comprising:

a machine housing;

a rotating winding nozzle mounted to said housing;

a receiver mounted to said housing below said housing;

a support plate mounted to and below said housing;

a former mounted to said housing, said support plate and said receiver so that it is positioned between said support plate and said receiver;

a plurality of lifters mounted to said former which are used to shape individual winding sections between said lifters;

a plurality of shaping fingers, having an upper and lower end, pivotally mounted to said former at said upper end of said fingers;

a mushroom cap disposed on said lower end of each of said shaping fingers;

at least one stripper mounted on said former; and a curved track on said support plate, whereby said shaping fingers move along said curved track to allow a wave winding to be formed;

whereby individual winding sections of a wave winding are formed between said lifters by said shaping fingers moving from the outside of said apparatus and extending into the intermediate spaces between said lifters, wherein said shaping fingers are rigidly guided by said curved track, where said shaping elements each have pivot points on at least said former and on said support plate.

6. The apparatus of claim 5, wherein said mushroom caps contain wire-guide grooves, whereby when said shaping element with said mushroom cap disposed at a lower end moves inward radially, said wire-guide groove enters a horizontal winding plane.

7. The apparatus of claim 5, wherein after a wave winding is produced, said at least one stripper pushes said winding axially on said former towards said receiver.

8. The apparatus of claim 5, wherein said shaping fingers are rigidly guided by guide disks, wherein said shaping elements each have pivot points on at least said guide disks.

* * * * *